Dec. 25, 1934.     O. C. KREIS     1,985,294
INTERNAL COMBUSTION ENGINE
Filed Jan. 21, 1929     2 Sheets-Sheet 1
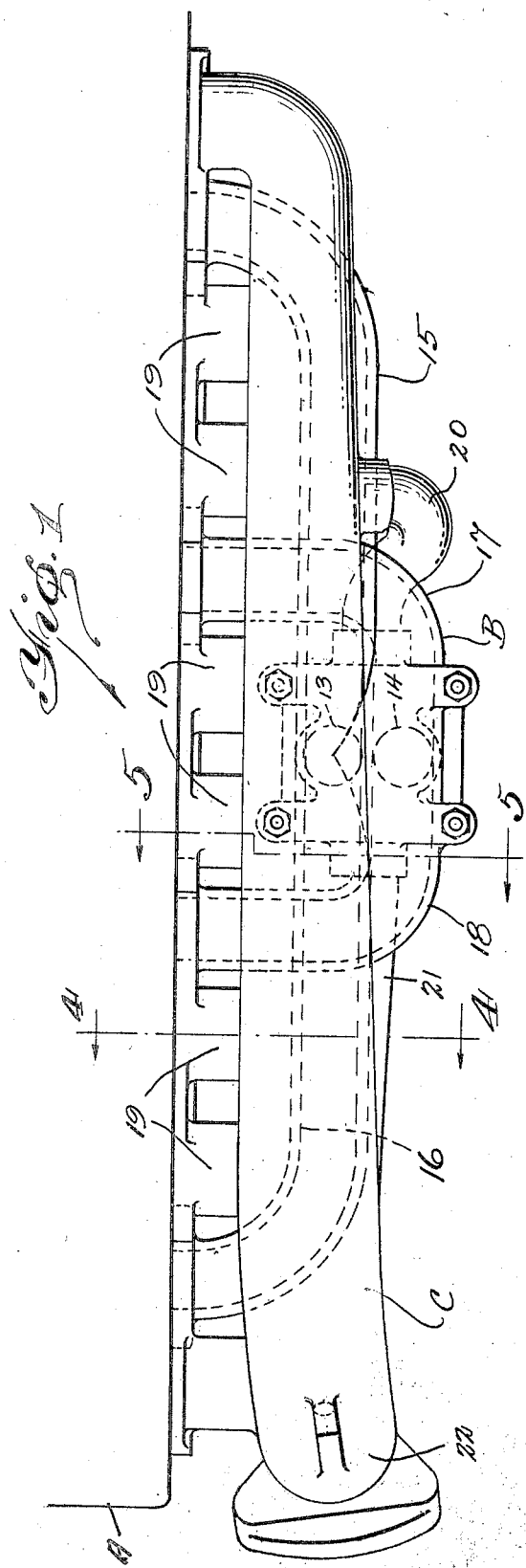
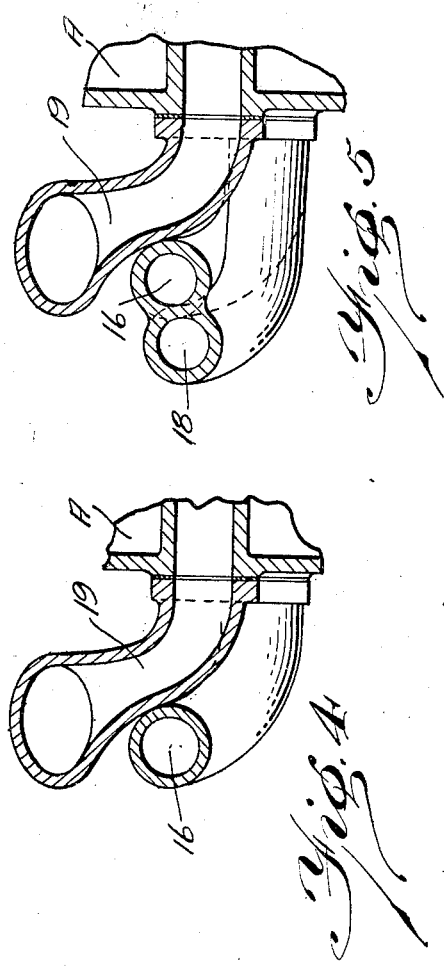
INVENTOR.
Oscar C. Kreis
BY
W. W. Harris
ATTORNEY.

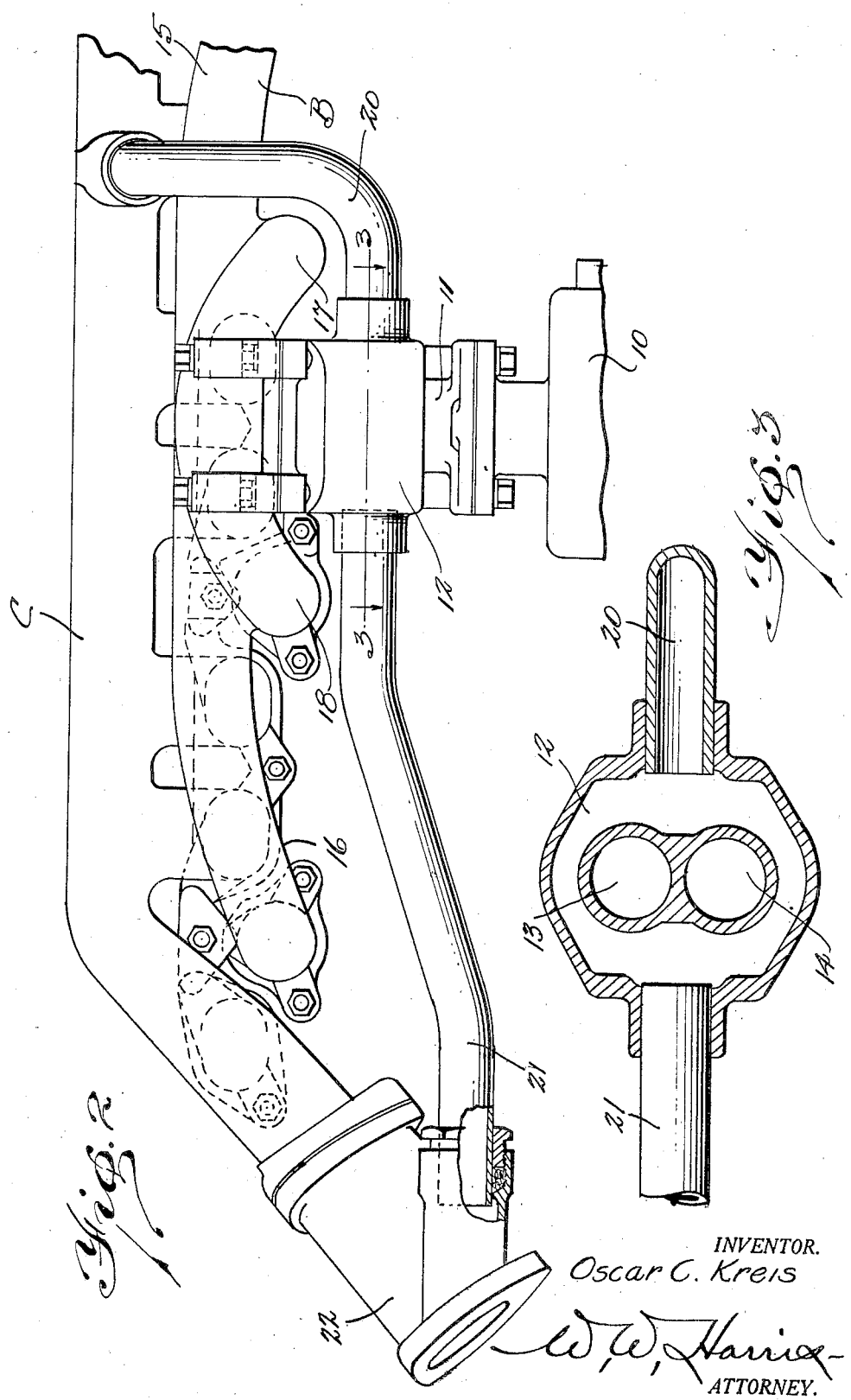

Patented Dec. 25, 1934

1,985,294

UNITED STATES PATENT OFFICE 1,985,294

INTERNAL COMBUSTION ENGINE

Oscar C. Kreis, Detroit, Mich., assignor to Continental Motors Corporation, Detroit, Mich., a corporation of Virginia Application January 21, 1929, Serial No. 333,793

26 Claims. (Cl. 123—52)

This invention relates to internal combustion engines and refers more particularly to an improved intake manifold arrangement.

It is an object of my invention to provide a construction for supplying fuel mixture to the engine in a manner affording improved efficiency and generally better engine performance.

In general my invention provides for an efficient distribution of fuel mixture to the various cylinders. In carrying out the objects of my invention I provide an intake fuel mixture manifold with branches leading to the various cylinders of the engine. A heater jacket applies heat to the intake manifold riser or other portion of the manifold before branching. As the fuel mixture passes through the manifold branches heat is applied in proportion to the lengths of the branches. Thus those branches which are longest receive the greatest heat and those which are shortest receive less heat or in some instances no heat in addition to that received prior to the branching. By reason of this construction the fuel mixture is introduced to the various cylinders at substantially the same temperature.

Referring to the accompanying drawings illustrating my invention,

Fig. 1 is a plan view of the manifolding arrangement,

Fig. 2 is an elevation view thereof,

Fig. 3 is a detail view of the heater box through line 3—3 of Fig. 2, and

Figs. 4 and 5 are detail views along lines 4—4 and 5—5 respectively of Fig. 1.

In the drawings reference character A represents the engine block, B the intake manifold, and C the exhaust manifold. The intake manifold B is supplied with fuel mixture by carburetor 10 connected with manifold riser 11 about which is a heater box or jacket 12. The carburetor 10 may be either the dual (duplex) or single jet type, that illustrated being the duplex with riser 11 formed in individual passages or sections 13, 14. The inner vertical passage 13 opens to manifold branches 15, 16 extending oppositely and generally longitudinally of the engine block A, the ends of the branches leading to the usual cylinder block passages for distribution to the cylinder intakes. The outer passage 14 likewise opens to manifold branches 17, 18 which extend inwardly toward the cylinder block preferably beneath the branches 15, 16. The manifolding illustrated is for an eight cylinder engine, the branches 15, 16 supplying fuel mixture to the outside end pairs of cylinders and branches 17, 18 supplying fuel mixture to the inside pairs of cylinders.

The exhaust manifold C is preferably positioned generally above the intake manifold with portions thereof in sufficient proximity to branches 15, 16 to supply heat thereto. To this end the exhaust manifold may have cylinder block communicating branches 19 which are positioned adjacent branches 16 and 15. The heater jacket is supplied with exhaust gases by pipe 20 from the exhaust manifold, a second pipe 21 conducting the exhaust gases from jacket 12 to a point of disposal such as the exhaust manifold outlet 22. If desired the passage of exhaust gases to jacket 12 may be regulated by suitable valve controlled means well known in the art.

By reason of my invention the relatively long branches 15, 16 are heated while the relatively short branches 17 and 18 are not heated. Thus the temperature of the intake mixture at the ends of branches 15, 16, 17 and 18 is substantially the same. The temperature of the intake mixture heated by jacket 12 is uniform where the mixture enters the manifold branches and because of the greater length of branches 15, 16 as compared with branches 17, 18 the intake mixture delivered by the longer branches would ordinarily have been cooled to a lower temperature than the intake mixture delivered by the shorter branches. It is to prevent this relatively cooling of the longer branches that heat is applied thereto by exhaust manifold branches 19, resulting in the delivery of fuel mixture from the various manifold branches at substantially uniform temperature. In this manner the efficiency and general performance of the engine is improved.

What I claim as my invention is:

1. In an internal combustion engine, fuel mixture supply means, an intake manifold having a distributing portion, means for applying heat to said portion, said intake manifold having a plurality of branches extending beyond the influence of the distributing portion heating means and delivering the fuel mixture from the said distributing portion to the engine, some of said branches being relatively longer than others, and means applying heat to said longer branches whereby to provide a delivery of the fuel mixture from the various branches at substantially uniform temperature.

2. In an internal combustion engine, fuel mixture supply means, an intake manifold having a distributing portion, means for applying heat to said portion, said intake manifold having a plurality of branches extending beyond the influence of the distributing portion heating means and delivering the fuel mixture from the said distributing portion to the engine, some of said branches being relatively longer than others, an exhaust manifold associated with the intake manifold to apply heat to the said relatively longer branches whereby the temperature of the fuel mixture delivered by the various branches is substantially uniform.

3. In an internal combustion engine, fuel mixture supply means, an intake manifold having a distributing portion, means for applying heat to said portion, said intake manifold having a pair of oppositely extending branches extending beyond the influence of the distributing portion heating means and delivering fuel mixture from the said distributing portion to the engine, a second pair of branches for said intake manifold extending from in front of the first pair of intake manifold branches to the rear thereof for delivering fuel mixture from the said distributing portion to the engine, the length of the branches of the first said pair being greater than the length of the branches of the second said pair, and means for applying heat to the first said pair of branches whereby the temperature of the fuel mixture delivered by the said first and second pairs of branches is substantially uniform.

4. In an internal combustion engine, fuel mixture supply means, an intake manifold having a distributing portion, means for applying heat to said portion, a plurality of pairs of separate manifold branches extending beyond the influence of the distributing portion heating means and for conducting fuel mixture from the said distributing portion to the engine, the branches of one pair being relatively longer than the branches of the other pair, and means applying heat to said longer branches.

5. In an internal combustion engine, fuel mixture supply means, an intake manifold having a distributing portion, means for applying heat to said portion, said intake manifold having a plurality of branches delivering the fuel mixture from the said distributing portion to the engine, some of said branches being relatively longer than the others, and means for applying a predetermined quantity of additional heat to said longer branches at a point remote from said distributing portion, whereby to effect a delivery of the fuel mixture from the various branches at substantially uniform temperature.

6. In an internal combustion engine, fuel mixture supply means, an exhaust manifold, an intake manifold having a distributing portion, means for applying heat to said portion, said intake manifold having a plurality of branches delivering the fuel mixture from the said distributing portion to the engine, some of said branches being relatively longer than the others, the longer of said branches having wall portions arranged to directly contact with a wall portion of said exhaust manifold to effect a heat transfer by conduction to heat the fuel passing therethrough.

7. In an internal combustion engine, fuel mixture supply means, an intake manifold, an exhaust manifold, said intake manifold having a fuel distributing portion, means for applying heat to said portion, said intake manifold composed of a plurality of branches leading from said distributing portion and extending beyond the influence of said distributing portion heating means whereby heat is lost therefrom by radiation, said branches delivering fuel mixture from said distributing portion to individual portions of the engine, some of said branches being relatively longer than the others, said longer branches arranged in heat transference relation with said exhaust manifold to substantially replenish heat lost by radiation therefrom.

8. In an internal combustion engine, fuel mixture supply means, an exhaust manifold, an intake manifold having a fuel distributing portion, means for applying heat to said portion, said intake manifold having a plurality of branches arranged in pairs and extending beyond the influence of said distributing portion heating means whereby heat is lost therefrom by radiation, said branches arranged for delivering the fuel mixture from said distributing portions to the engine, one pair of said branches being relatively longer than the other pair, said longer branches having portions remote from said fuel distributing portion arranged in thermal contact with said exhaust manifold to substantially replenish the heat lost by radiation from said longer branches.

9. In an internal combustion engine, fuel mixture supply means, an exhaust manifold, an intake manifold having a distributing portion, means for applying heat to said portion, said intake manifold having a plurality of branches delivering the fuel mixture from said distributing portion to the engine, one pair of said branches being relatively longer than the other pair, said longer branches constructed to directly contact with a portion of the exhaust manifold for transferring heat by conduction from said exhaust manifold to said longer branches.

10. In an internal combustion engine, fuel mixture supply means, an exhaust manifold, an intake manifold having a distributing portion, means for applying heat to said portion, said intake manifold having a plurality of branches extending beyond the influence of the distributing portion heating means whereby heat is lost therefrom by radiation, said branches delivering the fuel mixture from said distributing portion to the engine, one pair of branches being relatively longer than the other pair, said longer branches constructed to contact with a portion of the exhaust manifold remote from the distributing portion and intermediate the distributing portion and manifold outlet for heating the fuel passing through said longer branches whereby to provide a delivery of the fuel mixture from said longer branches at a temperature substantially the same as the temperature of the fuel mixture delivered from said shorter branches.

11. In an internal combustion engine, fuel mixture supply means, an intake manifold having a fuel distributing portion, means for applying heat to said portion, said intake manifold including a plurality of branches delivering the fuel mixture from said distributing portion to the engine, some of said branches being relatively longer than the others, and means independent of said distributing portion heating means for applying additional heat to said longer branches intermediate the fuel distributing portion and outlets, whereby to provide a delivery of the fuel mixture from the various branches at substantially uniform temperature.

12. In an internal combustion engine, an intake manifold associated therewith and provided with a plurality of branches, some of said branches being longer than the others, a fuel supply means communicating with said intake manifold, means for applying heat to the fuel mixture prior to distributing same to said branches, and means independent of said distributing portion heating branch, said latter branch being constructed to cross the first said branch.

23. A manifold structure for a multi-cylinder internal combustion engine having a source of fuel mixture supply in communication with said manifold structure and including a fuel mixture distributing means and a plurality of branches for conducting the fuel mixture from said distributing means to said engine cylinders, said branches extending longitudinally of the engine, some of said branches being relatively closer to said engine than other of said branches, the inside group of cylinders being supplied with fuel mixture from the branches most remote from said engine, and the outside group being supplied with fuel mixture from the branches lying relatively closer to said engine.

24. A manifold structure for a multi-cylinder internal combustion engine including branches extending longitudinally of the engine, one of said branches spaced laterally from the engine a greater distance than the other branch, said first branch connected with an intermediate group of engine cylinders and constructed to cross said other branch, and means for supplying a fuel mixture to said branches.

25. A manifold structure for a multi-cylinder internal combustion engine including branches extending longitudinally of the engine, one of said branches spaced laterally from the engine a greater distance than the other branch, said second branch connected with an end cylinder of the engine, said first branch connected with an intermediate engine cylinder and constructed to cross said second branch, and means for supplying a fuel mixture to said branches.

26. A manifold structure for an engine having eight aligned cylinders and including two pairs of oppositely extending manifold branches, one pair of branches extending longitudinally of the engine and spaced laterally a greater distance from the engine than said other pair of branches, said second pair of branches connected with the outside four cylinders, said first pair of branches connected with the inside four cylinders and constructed to cross said second pair of branches.

OSCAR C. KREIS.